April 24, 1934.  K. JAGSCHITZ  1,956,352
SEPARATING AND PURIFYING MEANS FOR THE SEALING
LIQUID OF WATERLESS GAS HOLDERS
Filed Dec. 5, 1931
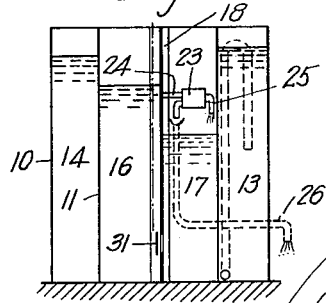
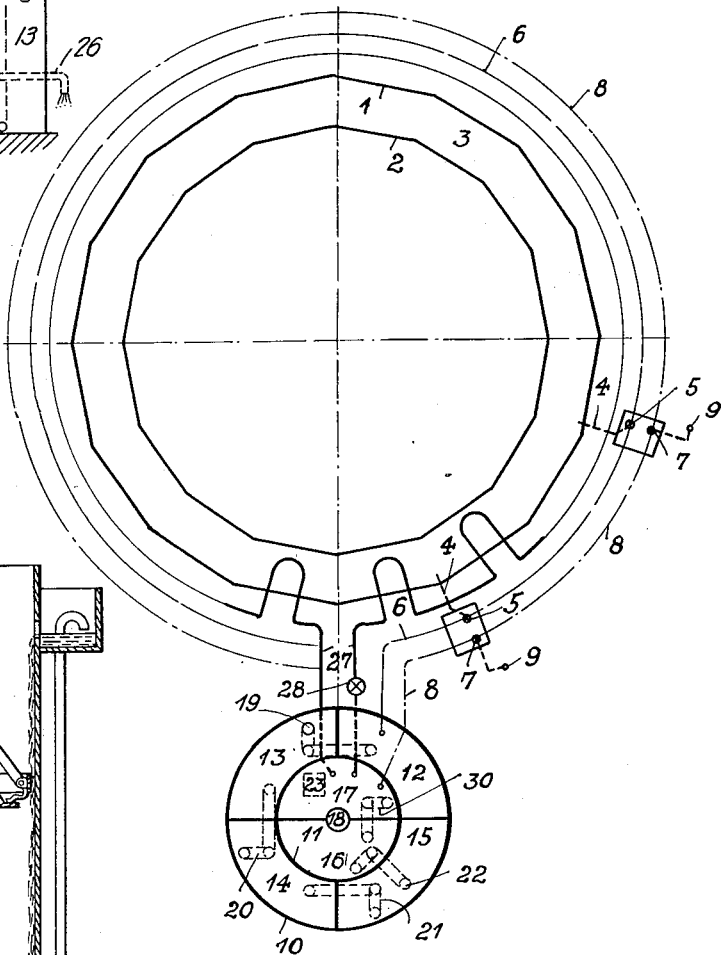
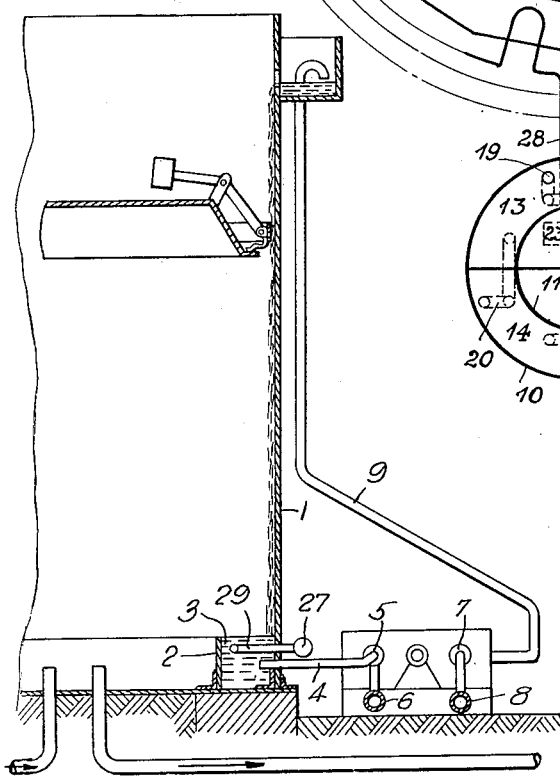
Inventor:
Konrad Jagschitz,
By Alfred ... 
  atty.

Patented Apr. 24, 1934

1,956,352

UNITED STATES PATENT OFFICE 1,956,352

SEPARATING AND PURIFYING MEANS FOR THE SEALING LIQUID OF WATERLESS GAS HOLDERS

Konrad Jagschitz, Mainz, Germany, assignor to Maschinenfabrik Augsburg-Nurnberg A. G., Nuremberg, Germany, a corporation of Germany Application December 5, 1931, Serial No. 579,146
In Germany December 17, 1930

4 Claims. (Cl. 48—176)

With waterless gasholders it is, as is well known, necessary to subdivide the sealing trough into a plurality of sectors in order to prevent the sealing liquid from flowing off over the lower rim of said trough in case of the latter being for any reason placed into an oblique position. Because of that subdivision, it is also necessary to provide separate conveying devices for every sector so that everyone of them having supplied to it accurately with the same amount of liquid that had escaped from it. Also a separate oil purifying or water separating plant had to be provided for every sector.

The present invention consists in a new arrangement and combination of parts constituting a central separating and purifying means for the sealing liquid, and this means is, moreover, combined with a heating device for the bottom collecting gutter of the liquid receptacle. Such an arrangement and combination of parts may be used advantageously in connection with centrifugal purifying devices for the sealing liquid. In order to insure the proper supply of every sector with the sealing liquid, annular pipes are provided which, on the one hand, conduct the escaped sealing liquid to the said central purifying means and, on the other hand, reconduct the purified sealing liquid in proper amounts from said means to the respective sector or sectors. That is effected in that two coupled pumps are provided for every sector, the pumps running synchronously and conveying equal amounts of liquid in equal periods of time. One of said pumps pumps the liquid that has escaped from the respective sector from the collecting gutter to the annular pipe, or to the said central purifying means respectively, whereas the other pump pumps the purified liquid from the other annular pipe to the sealing trough.

The advantages presented by the present invention consists, firstly, in the centralization of the water separating and purifying device, and secondly in that the heating device of the centrailized separating and purifying means can be used at the same time for heating the collecting gutter and the collecting tank for the escaped sealing liquid.

A particularly advantageous effect is attained if an additional purification of the sealing liquid by centrifugal action takes places, as in such a case each of the many purifying means becomes particularly complicated and the centralization of the same is, thus, of particular value. As against the old constructions employing from 4 to 8 or even a greater number of purifying means, according to the present invention only one such means is required.

The invention is illustrated diagrammatically and by way of example on the accompanying drawing on which Figure 1 is a top plan view of an embodiment of the invention, and Figure 2 a vertical section through the circular vessel shown in the lower part of Fig. 1, Fig. 2 being drawn to a slightly larger scale. Fig. 3 is a sectional view.

On the drawing, 1 (Fig. 1) indicates a polygonal waterless gasholder or shell having 16 sides. 2 indicates the inner confining wall of the collecting gutter 3 located at the bottom of the gasholder to receive the escaping sealing liquid. From the gutter 3 that liquid passes through pipes 4 and across small collecting vessels (not shown) to pumps 5 which force the liquid through an annular pipe 6 to the central purifying means. Each pump 5 is coupled (mechanically or electrically) with another pump 7 so that the coupled pumps will operate or stop simultaneously. The purpose of the pumps 7 is to suck through the annular pipe 8 liquid from the central purifying plant and force it through risers 9 to the sealing trough provided on the rim of the closure of the gasholder.

The central purifying means chiefly consists of two concentric cylindrical tanks 10 and 11 forming between them an annular space which is subdivided into a plurality of chambers by vertical partitions. There are, in the embodiment shown, four such partitions and, therefore, four such chambers are formed indicated at 12, 13, 14 and 15. The central space in the inner tank 11 is subdivided into two chambers 16 and 17 by means of a partition wall, and in the middle of this wall is provided a heating pipe 18 which may be heated by any suitable heating agent, e. g. steam, hot water, gas, electricity.

The purification proceeds as follows: The escaping sealing liquid is conducted into the chamber 12 through the annular pipe 6; in that chamber a portion of the lighter water separates from the heavier oil which latter filows through an overflow pipe 19 into the next chamber 13. The water floating on the top of the liquid escapes from time to time also automatically. From the chamber 13 the oil flows through an overflow pipe 20 into the adjacent chamber 14, from this again through an overflow pipe 21 into the chamber 15 and finally from the latter through a fourth overflow pipe into the inner chamber 16, the oil being finally deprived of all the water thus being purified in a continually increasing degree.

This purification will in the case of most cases be sufficient and the sealing liquid can be returned from chamber 16 to the sealing trough through the annular pipe 8. In that case the two chambers 16 and 17 may be in direct communication with one another so as to constitute only one chamber.

If, however, further purification is desired, then a centrifugal apparatus 23, or an equivalent or a similar device, may be provided, preferably within the central purifying means, as shown in Fig. 2, though the said device may also be arranged outside the purifying means. The sealing liquid is then conducted from the chamber 16 through the pipe 24 to the centrifugal apparatus 23, from which it is conducted through the discharge pipe 25 into the chamber 17. The separated water and, maybe, also the impurities, pass to the outside through the pipe 26. If the water should still contain valuable components, it may be led through one or more further separating devices in order to obtain and save such components.

It is also possible to so design the separating means that the liquid is subjected to centrifugal action only according to the requirement, that is to say only if the water should not have separated in a sufficient degree already in the separating chambers 13, 14, 15 and 16. If, however, this has been the case, the purified sealing liquid can be conducted through an overflow 30 or a slide controlled opening 31 directly from the chamber 16 into the chamber 17, thus, without being first conducted through the centrifugal apparatus. The overflow is, for that purpose, provided with a shut-off member and the slide can be opened and closed from the outside by means of suitable operating members.

The heating device 18 which is necessary for the central separating device in order to insure sufficient heating and to prevent the freezing of said device preferably also employed for heating the collecting gutter 3, and for this purpose another annular pipe 27 is provided into which heated water is forced by means of a circulating pump 28 which sucks the liquid from the chamber 17, into which that liquid is finally returned.

In order to attain uniform heating of the entire collecting gutter well-known devices, for instance reversing valves, may be used by means of which the direction of flow of the liquid in the annular pipe 27 may be reversed. Into said pipe are inserted a plurality of heating elements 29 which extend into the collecting gutter 3, and pipe 27 can, thus, be used for heating the small collecting receptacles, one of which is arranged at each of the pumps 5 and into which the discharged sealing liquid is conducted through the collecting gutter 3 and the supply pipes 4.

I claim:

1. In a gas holder of the waterless type, in combination with the sealing trough provided at the upper end of the gas holder and a collecting gutter provided at the base of the gas holder, a central separating and purifying means adapted to receive the sealing liquid from said collecting gutter, an annular conduit, connections between said conduit and said collecting gutter, a second annular conduit in communication with said sealing trough, both said conduits being in communication with said separating and purifying means, means in said first-named conduit for causing sealing liquid to flow from said collecting gutter into said separating and purifying means, and means in said second annular conduit for returning purified sealing liquid from said separating and purifying means to said sealing trough.

2. In a gas holder of the waterless type, in combination with the sealing trough provided at the upper end of the gas holder and a collecting gutter provided at the base of the gas holder, a central separating and purifying means, an annular conduit, connections between said conduit and said collecting gutter, a second annular conduit in communication with said sealing trough and said separating and purifying means, a pump in said first annular conduit for pumping sealing liquid from said collecting gutter into said separating and purifying means, and a pump in said second conduit for returning the purified sealing liquid from said separating and purifying means to said sealing trough, said pumps being operated in unison.

3. The combination as specified in claim 1, including a heating device provided in said separating and purifying means, a third annular conduit adapted to receive a heating medium from said heating device, and heating elements extending from said third annular conduit so as to convey heat to said collecting gutter.

4. The combination as specified in claim 1, wherein said central separating and purifying means is subdivided into compartments, including means for successively separating from the sealing liquid the water and lighter oils and including a centrifugal means to complete such separation, if necessary.

KONRAD JAGSCHITZ.